July 25, 1944.                S. H. GEFFNER                2,354,454
                            DENTAL FLOSS HOLDER
                            Filed March 21, 1944
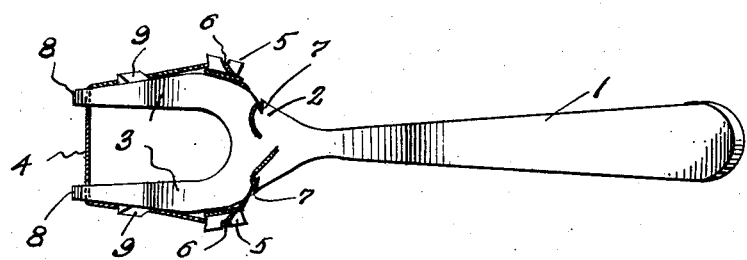
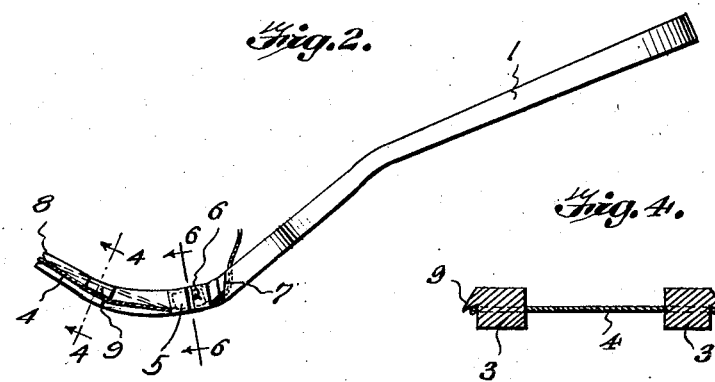
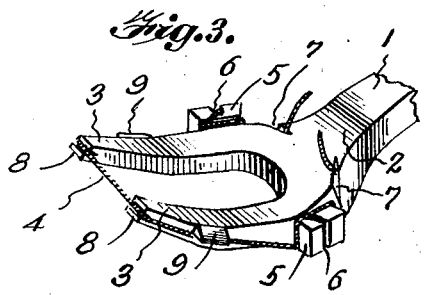
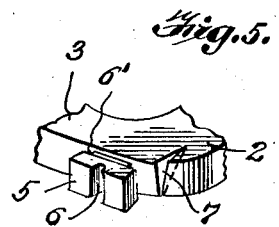
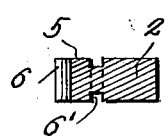
Inventor
SAMUEL H. GEFFNER
By Rose J. Woodward
                    Attorney Patented July 25, 1944

2,354,454

UNITED STATES PATENT OFFICE 2,354,454

DENTAL FLOSS HOLDER

Samuel H. Geffner, New York, N. Y.

Application March 21, 1944, Serial No. 527,431

4 Claims. (Cl. 132—91)

This invention relates to a dental floss holder and it is one object of the invention to provide a holder having a handle and forks or arms extending forwardly therefrom, the arms being provided with floss receiving notches at their outer ends and cleats at their inner ends for engagement by the floss applied to the holder, there also being provided lugs for tensioning the floss after it has been engaged with the notches and the cleats.

Another object of the invention is to so form and arrange the lugs that after the floss has been applied it may be snapped into engagement with the lugs and held tightly stretched and under tension.

Another object of the invention is to so form the lugs that while the floss may be easily snapped into engagement with them, it will not be liable to accidentally slip therefrom during use of the device.

Another object of the invention is to provide a floss holder which is simple in construction, easy to use, and capable of being manufactured at small cost.

In the accompanying drawing:

Fig. 1 is a view looking at the front of the holder with floss applied thereto.

Fig. 2 is a side view thereof.

Fig. 3 is a perspective view of the forked end portion of the holder with floss applied thereto.

Fig. 4 is a transverse sectional view on the line 4—4 of Fig. 2.

Fig. 5 is a fragmentary perspective view showing the formation of the floss-engaging cleat in detail.

Fig. 6 is a fragmentary sectional view on the line 6—6 of Fig. 2.

This improved floss holder is preferably formed of plastic material but may be formed of any suitable material and has a handle 1 of sufficient width and thickness to permit it to be readily held in a person's hand. The handle tapers toward its front end, where it is integrally united with a head 2 having forwardly projecting forks or arms 3 which are curved longitudinally and taper toward their front ends.

Referring to Figs. 2 and 3 of the drawing, it will be seen that the arms and head follow the same curvature longitudinally and at its rear end the head merges into the front end of the handle. It should also be noted that the handle has its forward portion extending at an incline with respect to the rest of its length in order that when the handle is held in a person's hand during use of the device, the disposition of the arms will be such that dental floss extending between the front ends of the forks may be conveniently passed through spaces between teeth and foreign matter removed.

The dental floss 4 is applied as shown in the drawing, and, referring thereto, it will be seen that in order to anchor ends of the floss there have been provided cleats 5 formed integral with the arms and projecting laterally from outer side faces of their rear end portions. These cleats may taper toward their inner ends and each is formed midway its front and rear edges with a groove or slot 6 and about its inner end with a circumferential groove 6'. There have also been provided diagonal grooves or notches 7 in side edge faces of the head rearwardly of but close to the cleats so that when a strand of dental floss is applied its end portions may be engaged in the notches and extended toward the rear end of the head. Since the notches taper inwardly, as shown clearly in Fig. 3, end portions of the floss will be gripped between walls of the notches and will not be liable to slip loose.

When the floss is applied, one end portion is engaged in a groove 6 of a cleat and then wrapped about the cleat in the groove 6' thereof and its end engaged in the adjacent notch 7. The floss is then carried forwardly and extended across the space between the blunt front ends of the arms with portions of the floss engaged in notches or transverse grooves 8 at front ends of the arms. After the floss has been engaged in the notch of the second arm, it is carried rearwardly and engaged in the groove of the second cleat, a portion being then wrapped about the cleat and wedged into the adjacent groove or notch 7 where it is firmly gripped. Lugs 9 project laterally of the arms from outer side faces thereof. These lugs have sloping outer side faces and flat lower faces which slope toward the arms, as shown in Fig. 4. The portions of the strand of floss extending between the cleats and front ends of the arms extends in straight lines along outer side edge faces of the arms when the floss is applied, as indicated by dotted lines in Fig. 3, but when these portions of the floss are snapped into engagement with the lugs, as shown in full lines, the floss will be stretched and placed under tension, the tension of the floss being increased due to the fact that the arms are sprung toward each other during movement of the floss into engagement with the lugs and then spring back toward their initial positions. The fact that the lugs have sloping side faces permits the floss to be easily slid over the lugs and into place against their upper faces.

When the floss is to be removed it is merely necessary to release it from the cleats and withdraw it from the notches at front ends of the arms. The used piece of floss will then be discarded, the holder cleaned and sterilized, and it is ready for application of another piece of floss when needed.

Having thus described the invention, what is claimed is:

1. A dental floss holder comprising a handle, a head at the front end of said handle curved longitudinally and formed with longitudinally extending transversely spaced arms having notches at their front ends, cleats extending outward from sides of inner ends of said arms, said cleats being each grooved about its inner end and having a slot midway of its width, the head having side edges formed with inwardly tapered grooves adjacent rear ends of said cleats, and lugs extending outwardly from outer side edge faces of said arms and having sloping outer side faces and flat upper end faces whereby a strand of floss engaged through the notches at front ends of the arms and wrapped about said cleats with portions engaging in the grooves of the cleats and the head may have its portions between the cleats and front ends of the arms snapped across the lugs to stretch and tension the floss.

2. A dental floss holder comprising a handle, a head at the front end of said handle curved longitudinally and formed with longitudinally extending transverse spaced arms having notches at their front ends, cleats extending outwardly from sides of inner ends of said arms whereby a strand of floss extending between front ends of the arms and through their notches with portions extending rearwardly therefrom may have its end portions wrapped about and anchored to the cleats, and lugs projecting outwardly from outer sides of said arms and having sloping outer side faces whereby the portions of the floss between the cleats and front ends of the arms may be snapped into place across the lugs to stretch the floss and place same under tension.

3. A dental floss holder comprising a handle, a head at the front end of said handle curved longitudinally and formed with longitudinally extending transversely spaced arms having seats at their front ends, means adjacent rear ends of said arms for anchoring ends of a strand of floss having a portion extending between front ends of the arms and other portions extending longitudinally of the arms, and lugs projecting laterally from outer sides of said arms and across which the last mentioned portions of the strand of floss are adapted to be snapped to stretch and tension the strand of floss.

4. A dental floss holder comprising a handle, a head at the front end of said handle curved longitudinally and formed with longitudinally extending transversely spaced arms, means adjacent rear ends of said arms for releasably anchoring ends of a strand of floss having an intermediate portion extending between and across front ends of the arms and end portions extending longitudinally of the arms, and members spaced from front and rear ends of said arms and projecting laterally therefrom and across which portions of the strand of floss intermediate ends of the arms are adapted to be snapped to stretch and tension the strand of floss.

SAMUEL H. GEFFNER.